(12) United States Patent
Yamashita et al.

(10) Patent No.: US 6,270,924 B1
(45) Date of Patent: *Aug. 7, 2001

(54) LITHIUM SECONDARY BATTERY

(75) Inventors: Yasuhisa Yamashita; Koji Hattori, both of Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/895,319

(22) Filed: Jul. 16, 1997

(30) Foreign Application Priority Data

Jul. 16, 1996 (JP) .................................................. 8-206661
Aug. 29, 1996 (JP) .................................................. 8-248673

(51) Int. Cl.$^7$ ........................................................ H01M 4/58
(52) U.S. Cl. ...................... 429/231.1; 429/224; 429/223; 429/221; 429/231.5; 429/231.6
(58) Field of Search ................................. 429/224, 223, 429/221, 231.1, 231.5, 231.6

(56) References Cited

U.S. PATENT DOCUMENTS

| | | | |
|---|---|---|---|
| 4,567,031 | 1/1986 | Riley | 423/593 |
| 5,081,102 | 1/1992 | Gay et al. | 505/1 |
| 5,110,696 | 5/1992 | Shokoohi et al. | 429/218 |
| 5,122,505 | 6/1992 | Gusman et al. | 505/1 |
| 5,135,732 * | 8/1992 | Barboux et al. | 423/593 |
| 5,177,055 | 1/1993 | Kinsman et al. | 505/1 |
| 5,264,201 | 11/1993 | Dahn et al. | 423/594 |
| 5,370,948 | 12/1994 | Hasegawa et al. | 429/223 |
| 5,449,577 | 9/1995 | Dahn et al. | 429/94 |
| 5,490,320 | 2/1996 | Hasegawa et al. | 29/623.1 |
| 5,496,664 | 3/1996 | Sterr | 429/224 |
| 5,589,300 | 12/1996 | Fauteux et al. | 429/218 |
| 5,599,642 | 2/1997 | Toshiro et al. | 429/194 |
| 5,626,635 | 5/1997 | Yamaura et al. | 29/623.5 |
| 5,629,110 | 5/1997 | Kobayashi et al. | 429/223 |
| 5,700,597 * | 12/1997 | Zhong et al. | 429/231.1 |
| 5,702,679 | 12/1997 | Sheargold et al. | 423/599 |
| 5,702,845 * | 12/1997 | Kawakami et al. | 429/224 |
| 5,705,296 | 1/1998 | Kamauchi et al. | 429/218 |
| 5,718,877 | 2/1998 | Manev et al. | 423/599 |
| 5,742,070 | 4/1998 | Hayashi et al. | 252/182.1 |
| 5,789,115 * | 8/1998 | Manev et al. | 429/224 |
| 5,792,442 | 8/1998 | Manev et al. | 423/599 |
| 5,807,646 * | 9/1998 | Iwata et al. | 429/224 |

FOREIGN PATENT DOCUMENTS

| | | |
|---|---|---|
| 0582448A1 | 2/1994 | (EP) . |
| 0709906A1 | 5/1996 | (EP) . |
| 7-006764 | 1/1995 | (JP) . |
| 8-153513 * | 6/1996 | (JP) . |
| 8-321300 | 12/1996 | (JP) . |
| WO94/25398 | 11/1994 | (WO) . |
| 9534919 | 12/1995 | (WO) . |
| 9612676 | 5/1996 | (WO) . |

OTHER PUBLICATIONS

"Preparation of Spherical $LiCoO_2$ Powders by the Ultrasonic Spray Decomposition and Its Application to Cathode Active Material in Lithium Secondary Battery"; Takashi Ogihara, et al.; *Journal of the Ceramic Society of Japan;* International Edition; 101 (Oct. 1993); No. 10; pp. 1128–1132.

"Electrochemistry and Structural Chemistry of $LiNiO_2$ (R3) for 4 Volt Secondary Lithium Cells"; Tsutomu Ohzuku, et al.; *J. Electrochem. Soc.;* vol. 140, No. 7, Jul. 1993; pp. 1862–1870.

* cited by examiner

*Primary Examiner*—Laura Weiner
(74) *Attorney, Agent, or Firm*—Ostrolenk, Faber, Gerb & Soffen, LLP

(57) ABSTRACT

The invention provides a lithium secondary battery, comprising a cathode having a spinel-structured lithium-manganese complex oxide as the active material, which is characterized in that the particles of said spinel-structured lithium-manganese complex oxide are hollow, spherical secondary particles formed by sintering of primary particles, and said secondary particles have a mean particle size of from about 1 to 5 micrometer and a specific surface area of from about 2 to 10 $m^2/g$. The lithium secondary battery has a high capacity and excellent charge-discharge cycle characteristics.

9 Claims, 2 Drawing Sheets

LITHIUM SECONDARY BATTERY

BACKGROUND OF THE INVENTION

1. Field of the Invention

The invention relates to a lithium secondary battery, and more particularly, a lithium secondary battery comprising a cathode having a spinel-structured lithium-manganese complex oxide as the active material.

2. Description of the Related Art

Portable and cordless electronic appliances are becoming increasingly popular. As the power source for such electronic appliances, there is a great demand for small-sized and lightweight secondary batteries having a high energy-density. Lithium secondary batteries comprising a non-aqueous electrolytic solution have been put to practical use to meet such demands.

In general, a lithium secondary battery includes a cathode having a lithium-containing compound as the active material, an anode having a material capable of absorbing and desorbing lithium such as a carbon material or lithium metal as the active material, and a separator containing a non-aqueous electrolytic solution or a solid electrolyte. The lithium-containing compound for the active material of the cathode may include, for example, $LiCoO_2$, $LiNiO_2$ and $LiMn_2O_4$ which are now under study. Recently, attention is drawn to a spinel-structured lithium-manganese complex oxide, such as typically $LiMn_2O_4$, since the complex oxide may have a high oxidation-reduction potential and since the raw materials for the complex oxide are inexpensive and therefore a stable supply of the complex oxide is expected. In that situation, various lithium secondary batteries comprising the complex oxide as the cathode active material have been proposed.

For example, Japanese Patent Application Laid-Open No. 6-333562 discloses a lithium secondary battery comprising an $LiMn_2O_4$-type compound as the cathode active material, in which the compound is in the form of spherical particles having uniformly-roughened surfaces and having a particle size range of from 0.1 to 1.1 micrometer and a median diameter of from 0.5 to 0.6 micrometer. Japanese Patent Application Laid-Open No. 8-69790 discloses a lithium secondary battery comprising a lithium-manganese complex oxide as the cathode active material, in which the complex oxide has a specific surface area of from 0.05 to 5.0 $m^2/g$.

However, the conventional lithium secondary batteries comprising such a spinel-structured lithium-manganese complex oxide as the active material are not yet satisfactory with respect to the battery capacity and the charge-discharge cycle characteristics.

Accordingly, the object of the present invention is to provide a lithium secondary battery having high capacity and excellent charge-discharge cycle characteristics.

SUMMARY OF THE INVENTION

The invention provides a lithium secondary battery of above mentioned kind, which is characterized in that the particles of said spinel-structured lithium-manganese complex oxide are hollow, spherical secondary particles formed by sintering of primary particles, and said secondary particles have a mean particle size of from about 1 to 5 micrometer and a specific surface area of from about 2 to 10 $m^2/g$.

In the above lithium secondary battery, said spinel-structured, lithium-manganese complex oxide may be represented by a general formula of $Li(Mn_{2-x}Li_x)O_4$ where $0 \leq x < 0.1$, and the Mn may or may not be partially substituted by Cr, Ni, Fe, Co or Mg.

Since the lithium secondary battery employs spherical hollow particles of a spinel-structured lithium-manganese complex oxide as the cathode active material, and the particle size and the specific area are controlled in the above described manner, the non-aqueous electrolytic solution can well penetrate into the spherical hollow particles, while being prevented from being decomposed, and the contact area between the non-aqueous electrolytic solution and the particles is enlarged. Therefore, the degree of utilization of the cathode active material in the battery of the invention is improved. In addition, since the cathode active material comprises relatively large secondary particles formed through sintering of primary particles, it can be well shaped while having a suitably large specific surface area. Even if the amount of the binder added thereto is reduced, the material can still be shaped into a cathode having an increased energy density per the unit volume.

In the above lithium secondary battery, said spinel-structured, lithium-manganese complex oxide is preferably represented by the general formula of $Li(Mn_{2-x}Li_x)O_4$ where $0 < x < 0.02$.

When the spinel-structured lithium-manganese complex oxide for use in the invention is represented by a general formula $Li(Mn_{2-x}Li_x)O_4$, it is preferable that x falls within the range of 0 to about 0.1, in order to obtain secondary batteries having higher energy efficiency and better charge-discharge cycle characteristics. More preferably, x in said general formula $Li(Mn_{2-x}Li_x)O_4$ falls within the range of greater than 0 and less than about 0.02, in order to obtain secondary batteries having much higher energy efficiency and much better charge-discharge cycle characteristics.

In addition, other spinel-structured lithium-magnesium complex oxides derived from those of $Li(Mn_{2-x}Li_x)O_4$ by substituting a part of the Mn site with any of Cr, Ni, Fe, Co and/or Mg are also employable in the present invention, while producing the same results.

The lithium secondary battery of the invention may comprise, as the active material for the anode, a material capable of absorbing and desorbing lithium such as a carbon material, or lithium metal or a lithium alloy. The non-aqueous electrolytic solution in the battery may be a solution as prepared by dissolving an electrolyte of a lithium salt, such as $LiPF_6$, $LiClO_4$, $LiBF_4$ or $LiAsF_6$, in a mixed solvent comprising propylene carbonate or ethylene carbonate, and diethoxyethane or dimethoxyethane. As the separator for the battery, employable is a porous polypropylene film or non-woven fabric. In place of the separator impregnated with such a non-aqueous electrolytic solution, also employable is a solid electrolyte.

Now, preferred embodiments of the invention are described hereinunder with reference to the following Examples.

PREFERRED EMBODIMENTS OF THE INVENTION

EXAMPLE 1

As the compounds of the metals constituting a lithium-manganese complex oxide, prepared were lithium nitrate and manganese nitrate. Next, the lithium nitrate and manganese nitrate were accurately weighed in a molar ratio, Li/Mn, of 1.02/1.98 to give a lithium-manganese complex oxide of Li(Mn$_{1.98}$Li$_{0.02}$)O$_4$, and put into a container, to which was added 1000 ml of a 1/1 by volume mixture of water/alcohol, and these were stirred to give a solution.

The resulting solution was atomized into a vertical-type thermal-decomposition furnace conditioned at a predetermined temperature falling between 600° C. and 800° C., at a rate of 1200 ml/hour through a nozzle, and cracked therein to obtain a powdery complex oxide. Next, the resulting complex oxide was put into an alumina sagger and annealed therein at a predetermined temperature falling between 300° C. and 900° C. for 2 hours. In that manner were obtained complex oxides, sample Nos. 11 to 15, of Li(Mn$_{1.98}$Li$_{0.02}$)O$_4$, as shown in Table 1. In Table 1, the samples marked with asterisk (*) are outside the scope of the present invention, while the others are within the scope of the invention.

Apart from these, a comparative sample, No. 16 in Table 1, of Li(Mn$_{1.98}$Li$_{0.02}$)O$_4$ was obtained according to a melt impregnation method. For this, prepared were starting materials of lithium nitrate and electrolytic manganese dioxide (EMD). Next, the lithium nitrate and EMD were accurately weighed in a molar ratio, Li/Mn, of 1.02/1.98, then ground and mixed in a ball mill, and thereafter calcined at 600° C. for 48 hours to obtain a complex oxide in which lithium had been melt impregnated into EMD.

In addition, another comparative sample, No. 17 in Table 1, of Li(Mn$_{1.98}$Li$_{0.02}$)O$_4$ was obtained according to a solid phase reaction method. For this, prepared were starting materials of lithium carbonate and manganese carbonate. Next, the lithium carbonate and manganese carbonate were accurately weighed in a molar ratio, Li/Mn, of 1.02/1.98, then ground and mixed in a ball mill, and thereafter calcined at 900° C. for 48 hours to obtain a complex oxide.

The pictures of the powdery complex oxides obtained hereinabove were taken through scanning electron microscope (SEM) photography, in which the morphology of the particles was observed and the particle size thereof was measured. In addition, the specific surface area of each complex oxide was obtained according to the nitrogen adsorption method. Further, the complex oxides were analyzed through X-ray diffractometry (XRD). The data obtained are shown in Table 1. In Table 1, LM indicates that the sample was a spinel-structured lithium-manganese complex oxide and gave no diffraction patterns of any impurities.

Figure 1:
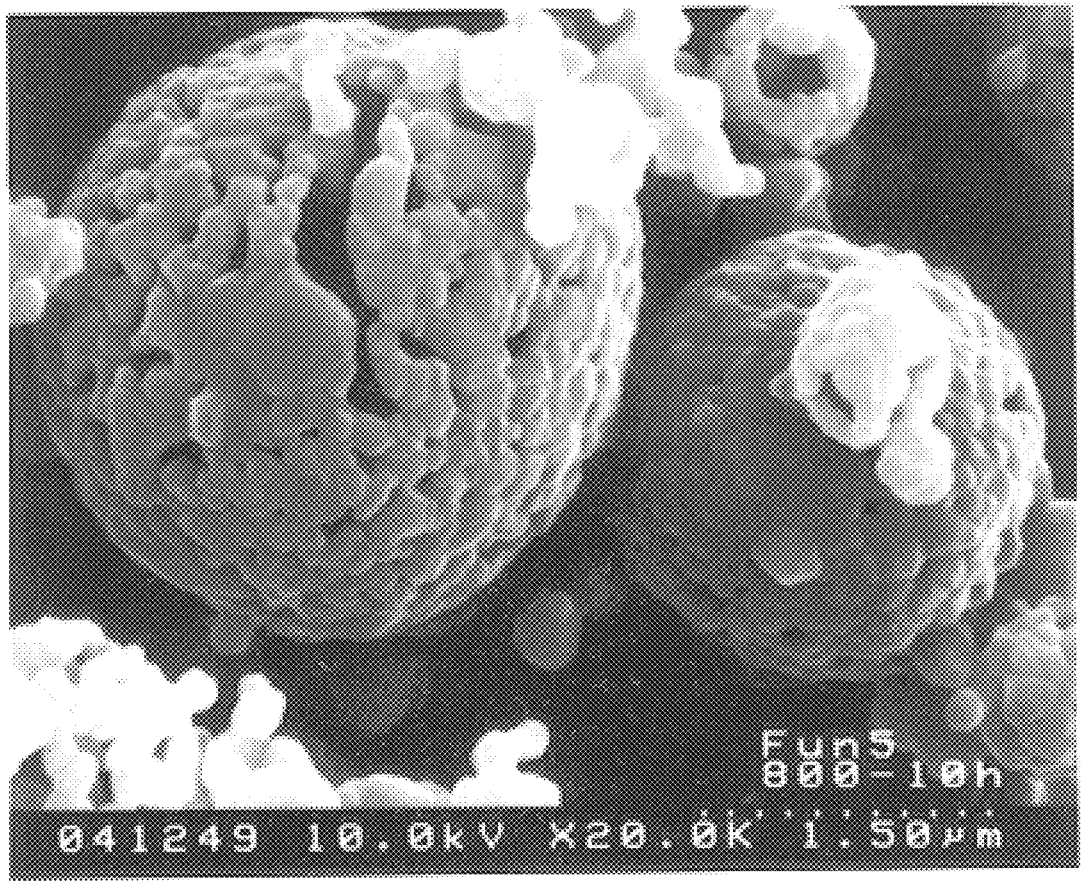
FIG. 1 is an SEM photograph of the cathode active material to be used in the lithium secondary battery of the present invention.

The SEM photograph of sample No. 1 is shown in FIG. 1. This show that the complex oxide of sample No. 1 comprised spherical, hollow and porous, secondary particles as formed through sintering of primary particles. The surface of each hollow, spherical secondary particle had many deep pores running into the inside thereof.

The powdery complex oxides obtained hereinabove were shaped into cathodes, whereupon their shapability was evaluated. Briefly, 100 parts by weight of the cathode active material (complex oxide), 5 parts by weight of a conductor (acetylene black), and from 5 to 20 parts by weight of a binder (polyethylene tetrafluoride) were kneaded and shaped into sheets. The shapability of the mixtures into sheets is shown in Table 1. In Table 1, "O" means that the mixture was well shaped into sheets; "P" means that the mixture was nearly shaped into sheets; and "X" means that the mixture could not be shaped into sheets.

TABLE 1

| Sample No. | Atomizing Temperature (° C.) | Annealing Temperature (° C.) | Shape of Particles | Mean particle Size (micrometer) | Specific Surface/Area (m$^2$/g) | XRD Analysis | Shapability Amount of Binder Added (parts) | | |
|---|---|---|---|---|---|---|---|---|---|
| | | | | | | | 5 | 10 | 20 |
| 11 | 800 | 800 | hollow spheres | 3.2 | 4.3 | LM | O | O | O |
| 12 | 800 | 600 | hollow spheres | 1.3 | 9.8 | LM | O | O | O |
| 13 | 600 | 800 | hollow spheres | 2.1 | | LM | O | O | O |
| *14 | 800 | 300 | hollow spheres | 1.1 | 25.1 | LM | P | O | O |
| *15 | 800 | 900 | hollow spheres | 7.5 | 1.1 | LM | O | O | O |
| *16 | 600 (melt impregnation) | | bulky mass | 1.3 | 5.0 | LM | X | P | O |
| *17 | 900 (solid phase reaction) | | bulky mass | 1.0 | 7.8 | LM | X | P | O |

Next, using the complex oxides obtained hereinabove as the cathode active material, produced were secondary batteries.

Precisely, 100 parts by weight of the complex oxide, 5 parts by weight of a conductor (acetylene black), and 5 parts by weight of a binder (polyethylene tetrafluoride) (for samples Nos. 16 and 17, 10 parts by weight of the binder was used since their shapability was poor as noted in Table 1) were kneaded and shaped into sheets. Each sheet was attached under pressure to a 17 mm-diameter disc of SUS mesh to prepare a cathode.

Figure 2:
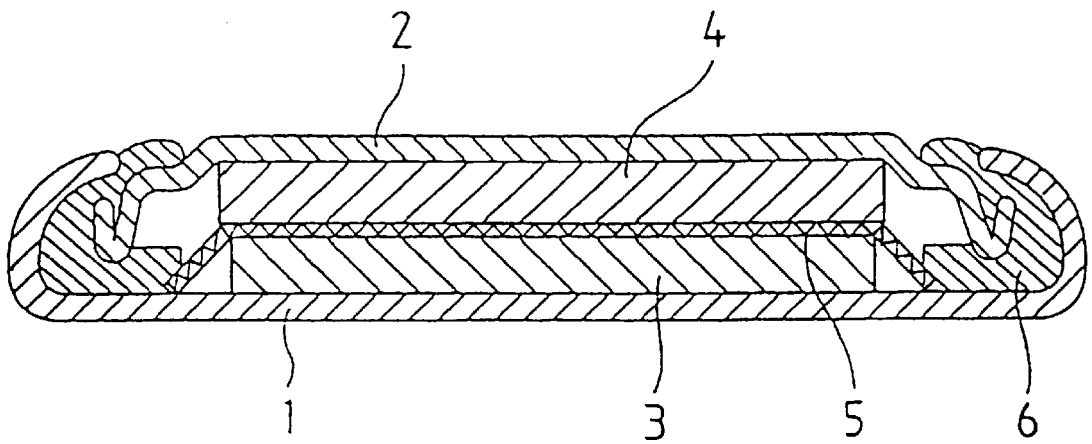
FIG. 2 is a cross-sectional view showing one embodiment of the lithium secondary battery of the invention.

Next, as shown in FIG. 2, the cathode 3 was combined with an anode 4 of lithium metal (diameter: 17 mm, thickness: 0.2 mm) with a polypropylene separator 5 therebetween, with the SUS mesh of the cathode 3 facing outward, and cased in a cathode cell 1 made of stainless steel with the cathode 3 facing downward. Then, an electrolytic solution was impregnated into the separator 5. As the electrolytic solution, used herein was a solution as prepared by dissolving LiPF$_6$ in a 1/1 (by volume) mixed solvent of propylene carbonate and 1,1-dimethoxyethane, to a concentration of 1 mol/liter. Next, the opening of the cathode cell 1 was sealed with an anode plate 2 made of stainless steel with an insulating packing 6 therebetween. Thus was obtained a lithium secondary battery.

Figure 3:
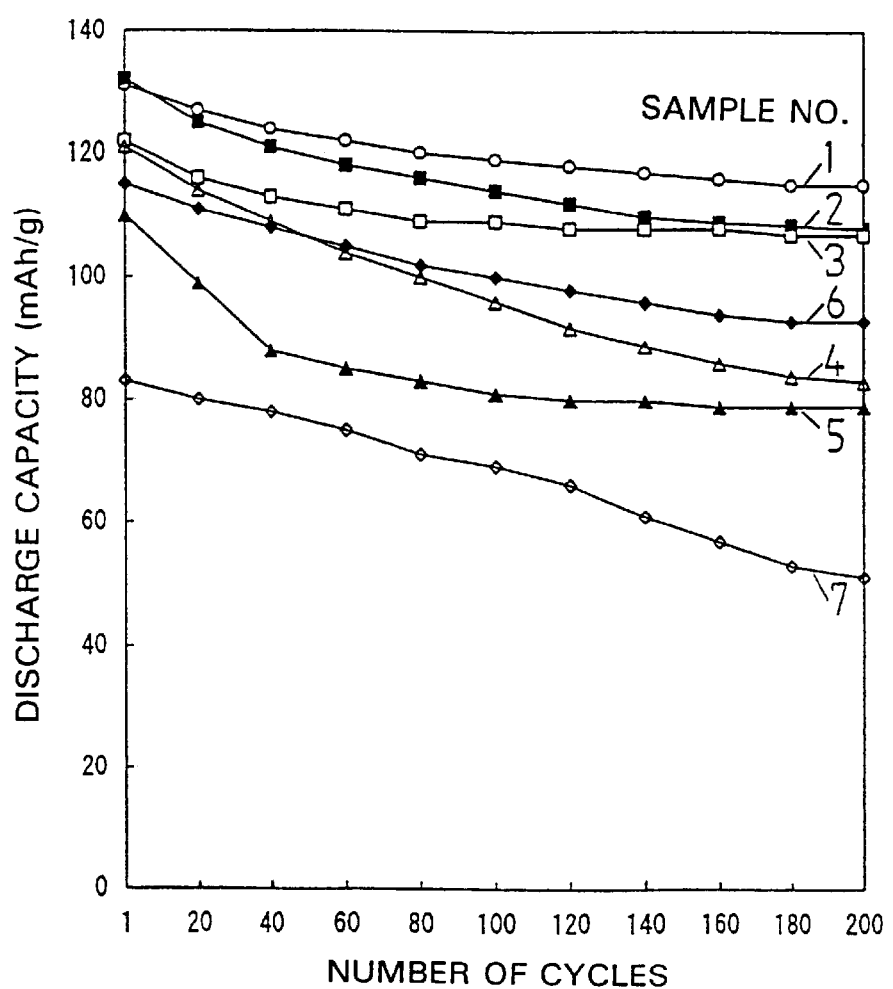
FIG. 3 is a graph showing the charge-discharge cycle characteristics of various lithium secondary batteries.

Next, the lithium secondary batteries thus obtained were subjected to a charge-discharge test of 200 cycles under the conditions such that the charge-discharge current density was 1.0 mA/cm$^2$, the max charge voltage was 4.3 V and the cut-off discharge voltage was 3.0 V. The test results are shown in FIG. 3. In FIG. 3, the sample numbers of the secondary batteries are the same as those of the complex oxides used as the cathode active materials.

From the data in Table 1 and FIG. 3, it is known that the lithium secondary batteries of samples Nos. 11 to 13 comprising, as the cathode active material, spinel-structured Li(Mn$_{1.98}$Li$_{0.02}$)O$_4$, which was in the form of spherical hollow secondary particles formed through sintering of primary particles to have a mean particle size of from about 1 to 5 micrometer (preferably about 1.3–4.9) and a specific surface area of from about 2 to 10 m$^2$/g (preferably about 2.1–9.8), had high capacity and excellent charge-discharge cycle characteristics.

As opposed to these, for the battery of sample No. 14 comprising particles of Li(Mn$_{1.98}$Li$_{0.02}$)O$_4$ having a specific surface area of larger than 10 m$^2$/g, its charge-discharge cycle characteristics were bad. This is because the contact area between the complex oxide particles and the non-aqueous electrolytic solution in this battery was too large, resulting in the non-aqueous electrolytic solution being decomposed too much. On the other hand, for the battery of sample No. 15 comprising complex oxide particles having a specific surface area of smaller than 2 m$^2$/g, its capacity was low. This is because the contact area between the complex oxide particles and the non-aqueous electrolytic solution in this battery was too small.

For the battery of sample No. 16 in which the complex oxide, Li(Mn$_{1.98}$Li$_{0.02}$)O$_4$ was bulky but not in the form of hollow spherical particles, its capacity was low. This is because the contact area between the complex oxide and the non-aqueous electrolytic solution could not be satisfactorily large and, in addition, the proportion of the active material in the cathode could not be increased because of the poor shapability of the material.

Like sample No. 16, the complex oxide Li(Mn$_{1.98}$Li$_{0.02}$)O$_4$ in the battery of sample No. 17 was bulky. Therefore, the capacity of the battery of sample No. 17 was low and the charge-discharge characteristics thereof were bad. This is because the contact area between the complex oxide and the non-aqueous electrolytic solution in this battery could not be satisfactorily large, the proportion of the active material in the cathode of this battery could not be increased because of the poor shapability of the material, and, in addition, the composition of the complex oxide used therein was not uniform since the oxide was formed through solid phase reaction.

EXAMPLE 2

As the compounds of the metals constituting a lithium-manganese complex oxide, prepared were lithium nitrate and manganese nitrate. The lithium nitrate and manganese nitrate were accurately weighed to give any of lithium-manganese complex oxides of a general formula Li(Mn$_{2-x}$Li$_x$)O$_4$ (where $0 \leq x \leq 0.1$), as shown in Table 2, and put into a container, to which was added 1000 ml of a mixture of water/alcohol, 1/1 by volume, and these were stirred to give a solution.

The resulting solution was atomized into a vertical-type heat-decomposition furnace conditioned at 700° C., at a rate of 1200 ml/hour through a nozzle, and cracked therein to obtain a powdery complex oxide. Next, the resulting complex oxide was put into an alumina sagger and annealed therein at 700° C. for 2 hours. In that manner were obtained complex oxides, sample Nos. 21 to 28, as shown in Table 2.

Pictures of the powdery complex oxides obtained hereinabove were taken through scanning electron microscope (SEM) photography, in which the particle size of the particles was measured. In addition, the specific surface area of each complex oxide was measured according to a nitrogen adsorption method. Further, the complex oxides were identified through X-ray diffractometry (XRD). The data obtained are shown in Table 2. In Table 2, LM indicates that the sample was a spinel-structured lithium-manganese complex oxide and gave no diffraction patterns of any impurities.

TABLE 2

| Sample No. | x in Li(Mn$_{2-x}$Li$_x$)O$_4$ | Shape of Particles | Mean Particle Size (micrometer) | Specific Surface Area (m$^2$/g) | XRD Analysis |
|---|---|---|---|---|---|
| 21 | 0 | hollow spheres | 3.7 | 4.1 | LM |
| 22 | 0.002 | hollow spheres | 3.7 | 4.0 | LM |
| 23 | 0.005 | hollow spheres | 3.8 | 4.0 | LM |
| 24 | 0.010 | hollow spheres | 3.7 | 4.1 | LM |
| 25 | 0.015 | hollow spheres | 3.8 | 3.9 | LM |
| 26 | 0.018 | hollow spheres | 3.8 | 4.0 | LM |
| 27 | 0.050 | hollow spheres | 3.7 | 4.1 | LM |
| 28 | 0.100 | hollow spheres | 3.7 | 4.0 | LM |

Next, using the complex oxides obtained above as the cathode active material, produced were secondary batteries.

Precisely, 100 parts by weight of complex oxide, 5 parts by weight of a conductor (acetylene black), and 5 parts by weight of a binder (polyethylene tetrafluoride) were kneaded and shaped into sheets. Each sheet was attached under pressure to a 17 mm-diameter disc of SUS mesh to prepare a cathode.

Next, in the same manner as in Example 1 but using the cathode prepared above, produced were lithium secondary batteries. These batteries were subjected to the same charge-discharge test as in Example 1. The test results are shown in Table 3. In Table 3, the sample numbers of the secondary batteries are the same as those of the complex oxides used as the cathode active materials.

TABLE 3

| | Discharge Capacity (mAh/g) | | |
|---|---|---|---|
| Sample No. | initial value | after 100 cycles | after 200 cycles |
| 21 | 134 | 116 | 109 |
| 22 | 134 | 119 | 112 |
| 23 | 133 | 118 | 114 |
| 24 | 132 | 121 | 115 |
| 25 | 131 | 120 | 116 |
| 26 | 130 | 120 | 116 |
| 27 | 121 | 111 | 107 |
| 28 | 102 | 99 | 97 |

As is obvious from the data in Table 2 and Table 3, when the degree of substitution of lithium for manganese x (in manganese-lithium complex oxides of formula Li(Mn$_{2-x}$Li$_x$)O$_4$ is larger than 0 (0<x), the Jahn-Teller phase transition of the complex oxides is prevented, resulting in that the capacity of the batteries comprising the complex oxides is prevented from being lowered after charge-discharge cycles. In addition, when the degree of substitution x is equal or smaller than about 0.1, preferably smaller than about 0.02, the batteries comprising the complex oxides may have more elevated initial capacity. Accordingly, the value x in the formula $Li(Mn_{2-x}Li_x)O_4$ is preferably within the range of $0 \leq x \leq 0.1$, more preferably $0 < x < 0.02$.

In the above-mentioned Examples, spinel-structured lithium-magnesium complex oxides of formula, $Li(Mn_{2-x}Li_x)O_4$ were used as the cathode active material. However, the complex oxides are not limited in the present invention. Any other spinel-structured lithium-magnesium complex oxides derived from those of $Li(Mn_{2-x}Li_x)O_4$ by substituting a part of the Mn site with any of Cr, Ni, Fe, Co and/or Mg are also employable in the present invention, while producing the same results.

Apart from the spray pyrolsis method employed in the above-mentioned Examples to prepare the cathode active materials (spinel-structured lithium-manganese complex oxides), other methods are also employable herein to prepare the complex oxide particles. For example, fine particles as obtained through wet synthesis may be grown to hollow, spherical secondary particles in a atomizing drier.

As has been described in detail hereinabove, the lithium secondary battery of the present invention comprises a spinel-structured lithium-manganese complex oxide as the active material, which is characterized in that the particles of said spinel-structured lithium-manganese complex oxide are hollow, spherical secondary particles formed by sintering of primary particles, and said secondary particles have a mean particle size of from about 1 to 5 micrometer and a specific surface area of from about 2 to 10 m$^2$/g. Accordingly, the lithium secondary battery of the invention has high capacity and excellent charge-discharge cycle characteristics.

Preferably, the complex oxide to be used as the cathode active material in the secondary battery of the present invention is represented by $Li(Mn_{2-x}Li_x)O_4$ where $0 \leq x \leq 0.1$, more preferably $0 < x < 0.02$. Using the complex oxide of that type, the lithium secondary battery of the present invention may have higher capacity and better charge-discharge cycle characteristics. In addition, other spinel-structured lithium-magnesium complex oxides derived from those of $Li(Mn_{2-x}Li_x)O_4$ by substituting a part of the Mn site with any of Cr, Ni, Fe, Co and/or Mg are also employable in the present invention, while producing the same results.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lithium secondary battery comprising a cathode having a spinel-structured lithium-manganese complex oxide as the active material, characterized in that the spinel-structured lithium-manganese complex oxide is in the form of hollow, spherical particle sinters formed of smaller size particles, and said particle sinters have a mean particle size of from about 1 to 5 micrometer and a specific surface area of from about 2 to 10 m$^2$/g.

2. The lithium secondary battery according to claim 1, characterized in that said spinel-structured lithium-manganese complex oxide is represented by the formula $Li(Mn_{2-x}Li_x)O_4$ where x is from 0 to about 0.1.

3. The lithium secondary battery according to claim 2, characterized in that said particle sinters have a mean particle size of from about 1.3 to 4.9 micrometer and a specific surface area of from about 2.1 to 9.8 m$^2$/g.

4. The lithium secondary battery according to claim 3, characterized in that said Mn is partially substituted by at least one member of the group consisting of Cr, Ni, Fe, Co and Mg.

5. The lithium secondary battery according to claim 2, characterized in that said x is greater than 0 and less than about 0.02.

6. The lithium secondary battery according to claim 5, characterized in that said particle sinters have a mean particle size of from about 1.3 to 4.9 micrometer and a specific surface area of from about 2.1 to 9.8 m$^2$/g.

7. The lithium secondary battery according to claim 6, characterized in that said Mn is partially substituted by at least one member of the group consisting of Cr, Ni, Fe, Co and Mg.

8. The lithium secondary battery according to claim 1, characterized in that said particle sinters have a mean particle size of from about 1.3 to 4.9 micrometer and a specific surface area of from about 2.1 to 9.8 m$^2$/g.

9. The lithium secondary battery according to claim 1 including a non-aqueous electolyte.

* * * * *